(12) United States Patent
Holtgraver (10) Patent No.: US 11,879,564 B2
(45) Date of Patent: Jan. 23, 2024

(54) ROTARY VALVE LOCKOUT APPARATUS

(71) Applicant: QTRCO, Inc., Tomball, TX (US)

(72) Inventor: Edward G. Holtgraver, Tomball, TX (US)

(*) Notice: Subject to any disclaimer, the term of this patent is extended or adjusted under 35 U.S.C. 154(b) by 0 days.

(21) Appl. No.: 18/149,547

(22) Filed: Jan. 3, 2023

(65) Prior Publication Data

US 2023/0213114 A1 Jul. 6, 2023

Related U.S. Application Data (60) Provisional application No. 63/296,731, filed on Jan. 5, 2022.

(51) Int. Cl.
*F16K 35/02* (2006.01)

(52) U.S. Cl.
CPC ......... *F16K 35/025* (2013.01); *Y10T 70/5633* (2015.04); *Y10T 137/7256* (2015.04)

(58) Field of Classification Search
CPC ........ F16K 35/00; F16K 35/02; F16K 35/022; F16K 35/025; F16K 35/10; Y10T 70/5615; Y10T 70/5619; Y10T 70/5633; Y10T 137/7069; Y10T 137/7256
USPC .............. 70/175–180; 137/383, 385; 251/89, 251/101–116
See application file for complete search history.

(56) References Cited

U.S. PATENT DOCUMENTS

| | | | | | |
|---|---|---|---|---|---|
| 1,687,814 | A | * | 10/1928 | Westbrook | B60K 15/0409 70/176 |
| 2,405,940 | A | * | 8/1946 | Burkhardt | F16K 5/0242 251/231 |
| 2,838,270 | A | * | 6/1958 | Danielson | F16K 31/60 403/372 |
| 4,881,388 | A | * | 11/1989 | Pruim | F16K 35/06 70/177 |
| 5,261,445 | A | * | 11/1993 | Jones, Jr. | F16K 35/06 70/179 |
| 2004/0094205 | A1 | * | 5/2004 | Shuter | F16K 35/022 137/385 |
| 2020/0132215 | A1 | * | 4/2020 | Neu | F16K 35/10 |

* cited by examiner

*Primary Examiner* — Kevin F Murphy
*Assistant Examiner* — Jonathan J. Waddy
(74) *Attorney, Agent, or Firm* — Bushman Werner, P.C.

(57) ABSTRACT

An apparatus for locking the position of the rotary valve, wherein the valve has a valve shaft adapted to have first and second opposed flatted formations. The apparatus includes first and second cam followers. The cam followers are reciprocally movable via the action of a cam assembly comprising first and second cams mounted on a rotatable cam stem. The cam followers can be simultaneously moved in opposite directions whereby engagement walls in the first and second cam followers can engage the first and second opposed flatted formations simultaneously.

2 Claims, 7 Drawing Sheets

ROTARY VALVE LOCKOUT APPARATUS

CROSS REFERENCE TO RELATED APPLICATION

This application claims priority to U.S. Application No. 63/296,731 filed Jan. 5, 2022, the disclosure of which is incorporated herein by reference for all purposes.

FIELD OF INVENTION

The present invention relates to valve-actuator combinations and, more particularly, to a lockout apparatus which enables users of rotary valves to lock the valve in a specified rotational position usually to provide a safe operating environment for piping maintenance personnel.

BACKGROUND OF THE INVENTION

Currently, locking a rotary valve in a desired position is accomplished by inserting a pin, typically, in the valve shaft and a specially designed mounting bracket. This method requires a separate pin that might be chained to the bracket to prevent it being misplaced and also a perfectly aligned shaft/bracket hole combination to allow pin insertion.

SUMMARY OF THE INVENTION

In one embodiment, the apparatus of the present invention operates by pinching opposed flatted surfaces of a valve/actuator shaft.

In another embodiment, the apparatus of the present invention operates by pinching opposed flatted surfaces on a coupler that connects the valve shaft and actuator shafts.

In another embodiment of the present invention, the apparatus provides a method to adjust the alignment between the pinching assembly and the flatted coupler/shaft surfaces. This is desirable because not all valves require the exact same position when being locked, due either to the valve design or to shifting valve shaft position over time such as from bracket slippage, valve torque induced shaft windup, etc.

In one embodiment, the apparatus is mounted below the actuator and above the valve, i.e., the apparatus is a bottom mounted lockout (BMLO). However, it can be mounted on the top side of the actuator from the valve if the actuator shaft and engagement can provide sufficient strength to ensure locking with full actuator torque output.

In another embodiment, there are fasteners, e.g., bolts, which connect the valve and actuator, usually via a mounting bracket, and which pass from the mounting bracket, through the BMLO, and into the actuator to provide the ability for the actuator to apply the necessary torque to operate the valve. The BMLO can have spacers to prevent crushing of the plates which form part of the BMLO, the crushing of which would prevent their subsequent movement.

In another embodiment the BMLO comprises a stack of four plates, two of which are moveable, two cams and a lever to cause rotation of the cams which then impart opposite directional movement of the moveable plates.

In the normal position, the moveable plates provide no resistance to actuator valve rotation but when the cams are rotated 180 degrees by the lever, the moveable plates are caused to move toward one another until they contact the opposed flatted surfaces of the coupler/shaft. In this position, the cams are axially aligned with the moveable plates such that forces against the flatted surfaces of the plates from any applied actuator or valve torques, are unable to result in rotational torque being applied to the cams. The moveable plates remain in the lockout position so long as the cams are not rotated by operating personnel. The apparatus can include tag out/lock out padlocks so that operating personnel are unable to cause cam rotation without proper authorization. Similarly, padlock provisions can be included to prevent unauthorized engagement of the lockout.

In still a further embodiment, the plates, both stationary and moveable, can have markings or other indicia to provide visual indication of their relative positions so that operating personnel are able to quickly determine the state of operation of the valve. Additionally, switches and other means of providing local and/or remote position indication can be incorporated into the BMLO.

DESCRIPTION OF THE PREFERRED EMBODIMENTS

Figure 1:
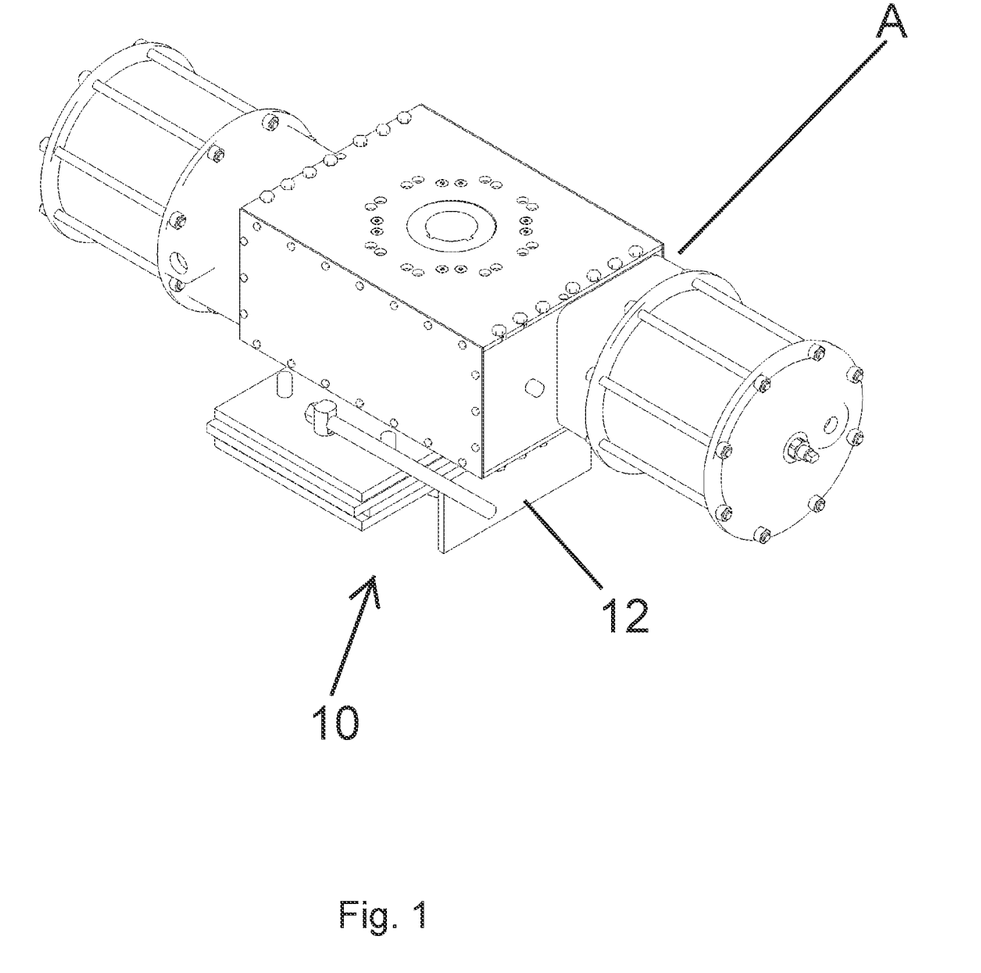
FIG. 1 is a perspective view of one embodiment of the BMLO apparatus of the present invention positioned below an actuator and above a valve (not shown) to which the actuator would be attached.
Figure 2:
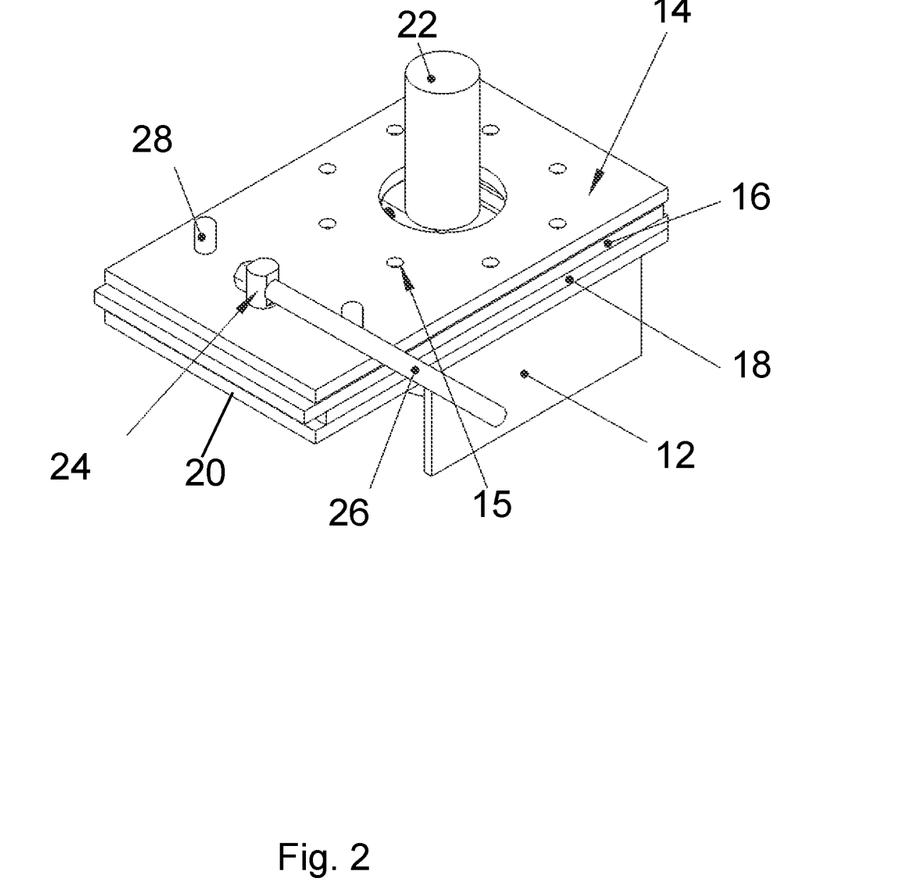
FIG. 2 is a perspective view of the BMLO apparatus of FIG. 1 with the actuator removed.

Referring first to FIG. 1, the apparatus (BMLO) of the present invention shown generally as 10, is seen as positioned below an actuator A and above a typical bracket 12 used to connect actuator A to a rotary valve (not shown). Turning to FIG. 2, it can be seen that the BMLO 10 of the present invention comprises four stacked plates, 14, 16, 18, and 20. As shown in FIG. 2, valve shaft or actuator shaft 22 extends through registering openings in the plates 14-20. Plate 14 includes bores 15 for fasteners (not shown) to mount the apparatus 10 to the actuator. It will be appreciated that the number and position of bores 15 can vary depending on the nature of the particular actuator. It is to be understood that while the valve or actuator shaft can be formed with opposed flatted, e.g., wrench, surfaces typically a coupler 32 (see FIG. 3) is used to connect the actuator and rotary valve shaft together, the coupler being provided with flatted surfaces as seen hereafter. The shaft/coupler can be square in cross-section providing two other opposed flatted surfaces or formations.

A cam stem 24 extends through registering openings in plates 14, 16, and 18, and has removably attached thereto a lever 26 by which stem 24 can be rotated 180° from the position shown in FIG. 2 until lever 26 engages stop 28 connected to and extending upwardly from plate 14.

Figure 3:
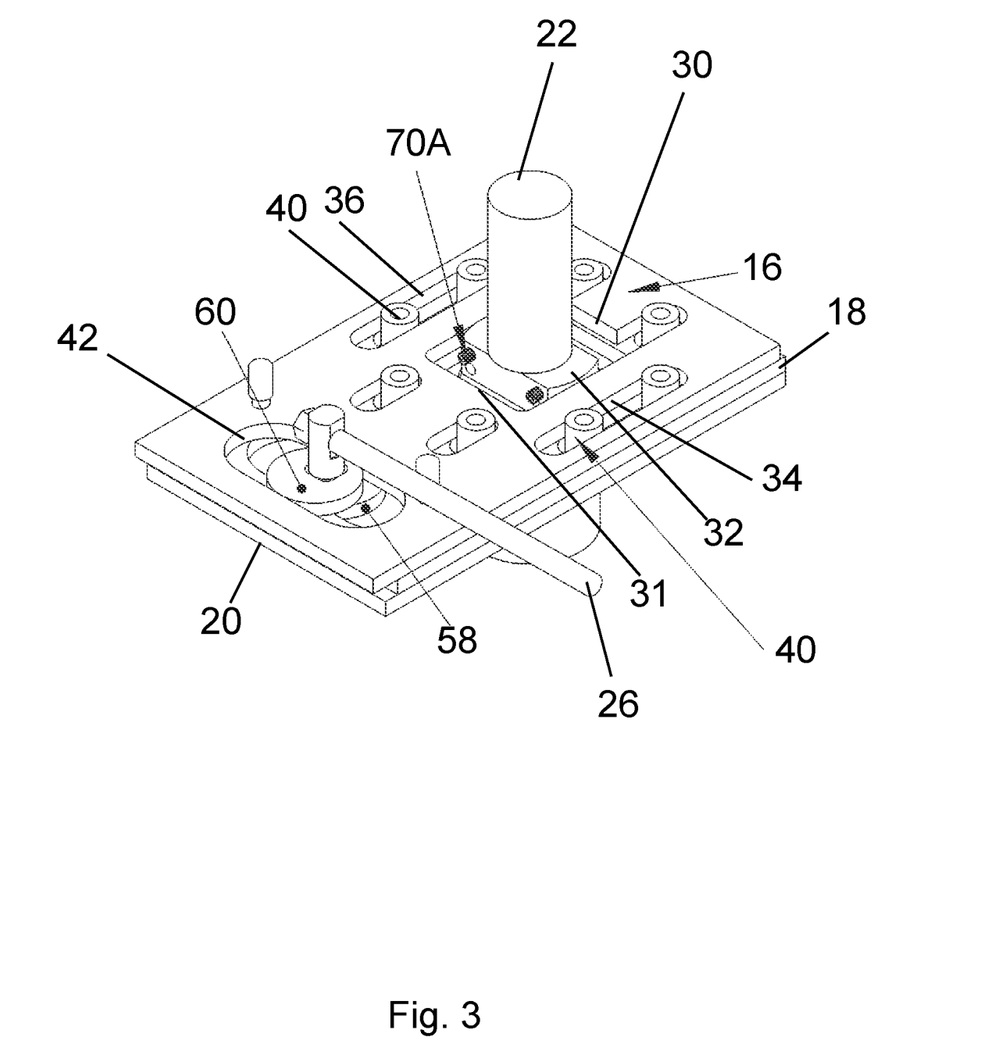
FIG. 3 is a perspective view of the BMLO shown in FIG. 2 but with the top fixed plate removed and the BMLO in the unlocked position.

FIG. 3 shows the BMLO 10 with the top, fixed plate removed. As shown, movable plate 16 has an H-shaped aperture 30 through which shaft 22 extends, shaft 22 being connected to a coupler 32. H-shaped aperture 30 is partially defined by an engagement wall section 31. Plate 16 is also provided with slots 34 and 36 located on opposite sides of H-shaped aperture 30. Guides/spacer posts 40 extend through slots 34 and 36. Plate 16 also has a second aperture 42 in which is disposed a first cam plate 60 which is fixedly attached to stem 24 and which, as can be seen, is generally coplanar with plate 16.

Figure 4:
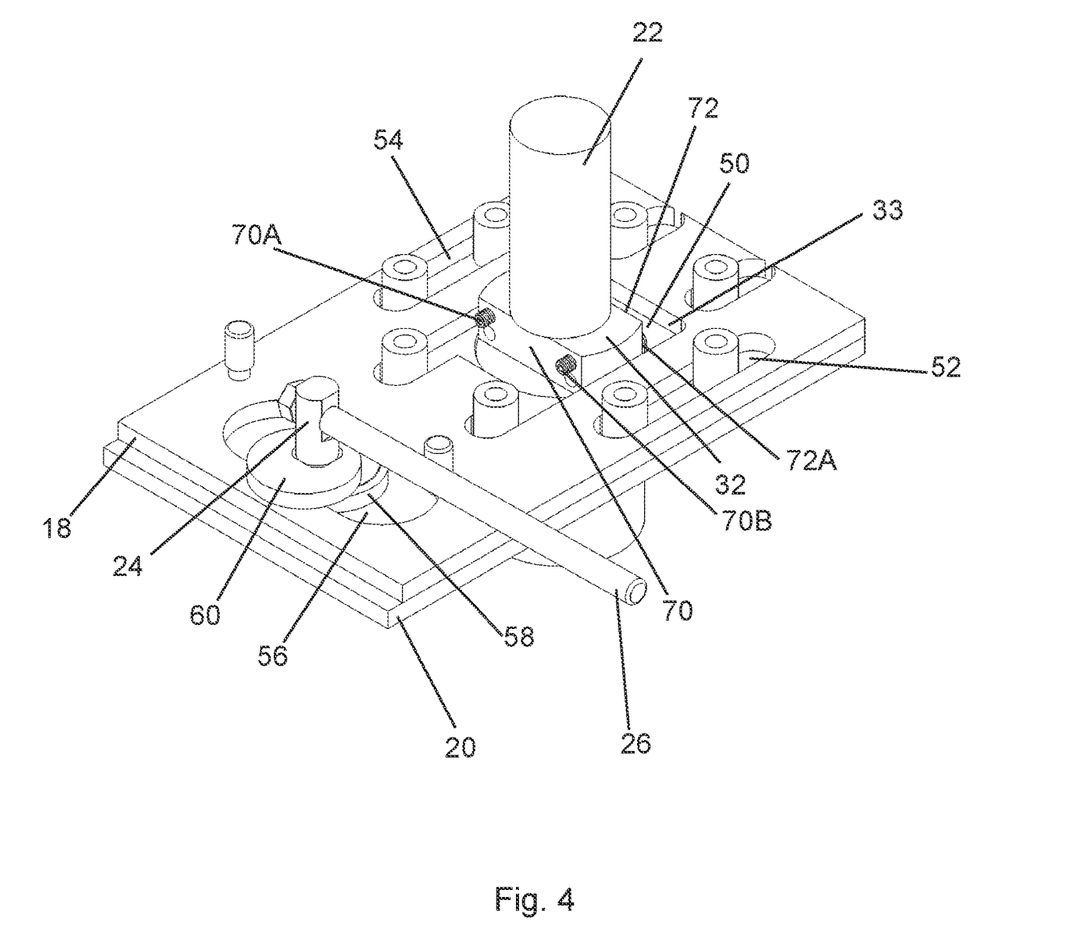
FIG. 4 is a perspective view of the BMLO shown in FIG. 2 with the top fixed plate and top movable plate removed.

Turning now to FIG. 4, the BMLO 10 of the present invention is shown with the top fixed and movable plates (14, 16) removed. Bottom movable plate 18 has an H-shaped aperture 50 similar to aperture 30 but rotated 180° relative to aperture 30. H-shaped aperture 50 is partially formed by an engagement wall 33. Plate 18 also has slots 52 and 54 as well as an aperture 56 in which is positioned a second cam plate 58, cam plate 58 being substantially co-planar with movable plate 18. As can be seen from FIG. 4, cam plates 60 and 58 can be of various shapes but as shown in one embodiment are generally circular and are eccentrically mounted on stem 24, cam plates 58 and 60, when mounted, being axially displaced and laterally positioned 180° from one another. FIG. 4 also shows in greater detail, the flatted surfaces of coupler 32. In this regard, coupler 32 has a first flatted surface 70 and a second flatted surface 72, flatted surface 70 being provided with spaced engagement position screws 70A and 70B which can be independently adjusted. In a similar fashion, flatted surfaces 72 has spaced engagement position screws, only one of which 72A is shown. Engagement screws 70A and 70B are generally coplanar with top movable plate 16 while engagement screws 72A and the other engagement screw not shown, are generally coplanar with bottom movable plate 18. Thus, it will be appreciated that linear movement of plate 16 in response to the action of cam plate 60 will drive engagement wall section 31 into engagement with screws 70A and 70B while corresponding movement of cam plate 58 against bottom movable plate 18 will drive engagement wall section 33 into engagement with screws 72A and other screw (not shown) extending from flatted surface 72. Accordingly, by proper adjustment of the screws 70A, 70B, 72A, and 72B (not shown), engagement wall section 31 can be brought into engagement with engagement screws 70A and 70B and engagement wall section 33 can be brought into simultaneously engagement with adjustment screws 72A. It will be understood that the engagement with adjustment screws by the wall sections is effectively operative engagement with the flatted surfaces of coupler 32. It will be appreciated that adjustment screws 70A and 72A are optional, since the flatted surfaces per se can be the surfaces engaged by the movable plates. However, the adjustment screws afford fine tuning. Basically, wall sections 31 and 33 can be considered follower surfaces in the sense that moveable plates 16 and 18 are cam followers.

Figure 5:
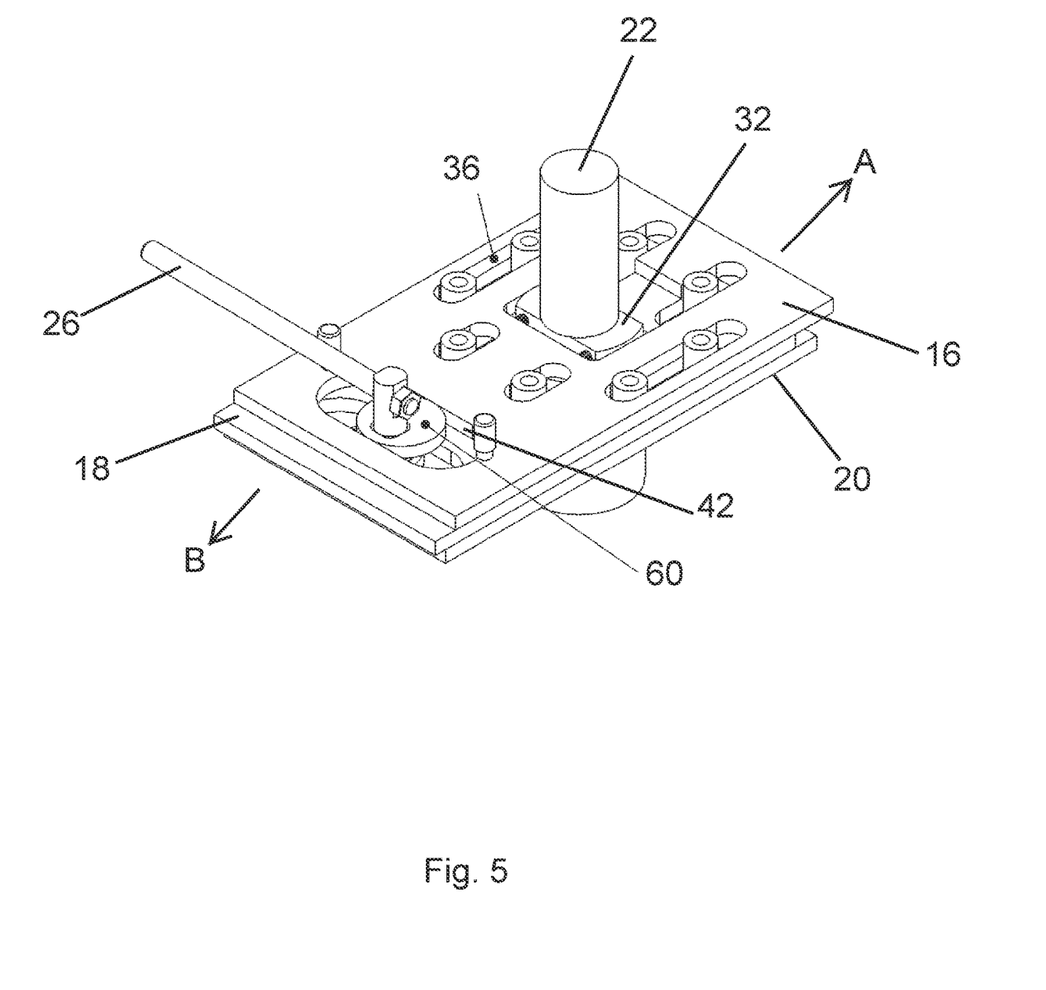
FIG. 5 is a perspective view of the BMLO of FIG. 2 with the top fixed plate removed and the apparatus in the lock out position.

It will thus be appreciated that when lever 26 is moved 180° from the position shown in FIG. 4 to the position shown in FIG. 5, the cam plates 60 and 58 being in driving engagement with movable plates 16 and 18, respectively, will result in the opposite movement of movable plates 16 and 18 in the direction of arrows A and B, respectively. Furthermore, the movement of the plates 16 and 18 will be substantially simultaneous such that the engagement wall sections 31 and 33 will engage the adjustment screws on coupler 32 at substantially the same time.

Figure 6:
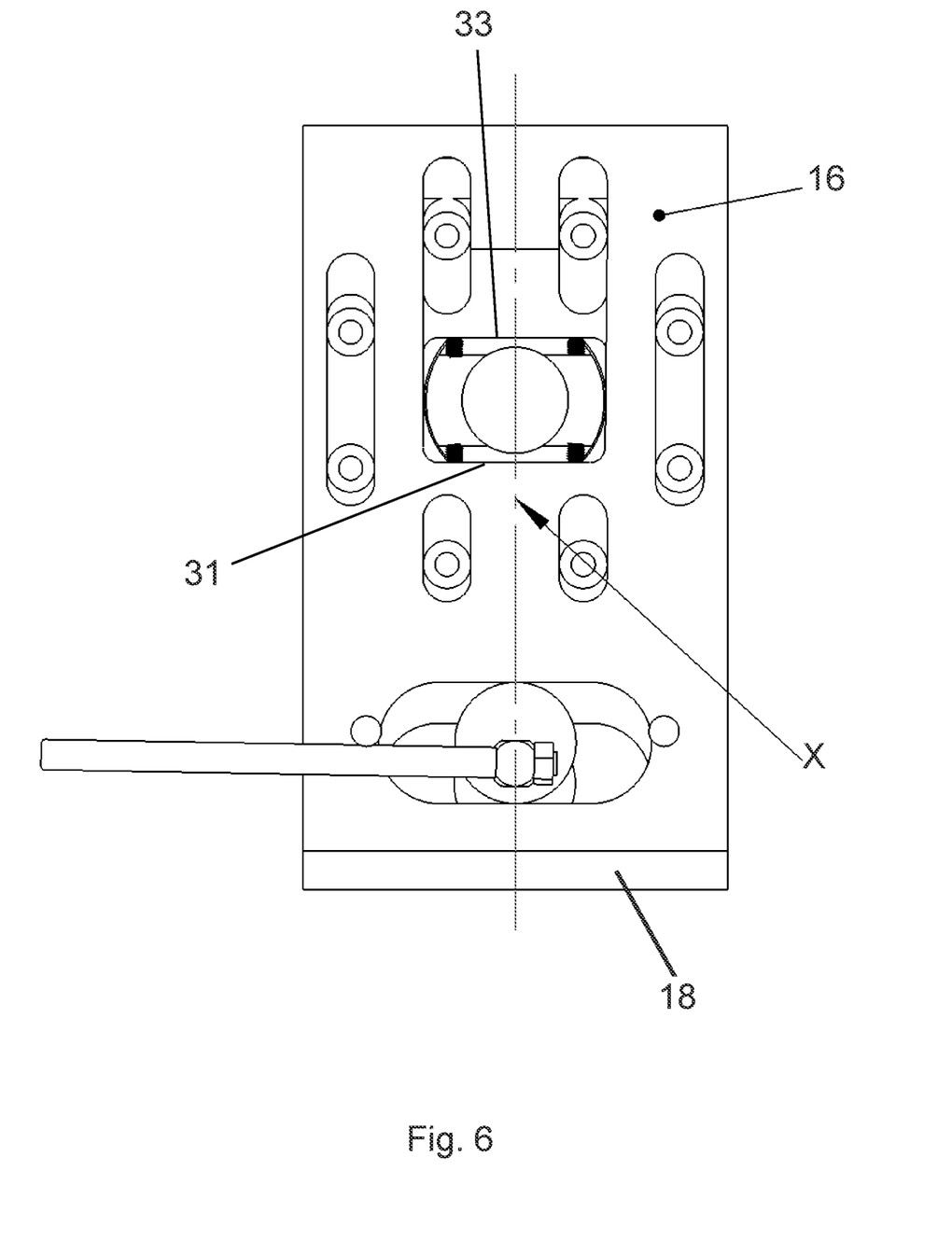
FIG. 6 is a top plan view of the BMLO shown in FIG. 5.

This engagement in the lockout position as depicted in FIG. 6 shows the moveable plates 16 and 18 axially aligned with the cam shaft axis X thereby preventing rotation of the cam axially through forces which might act on the movable plates 16 and 18.

Figure 7:
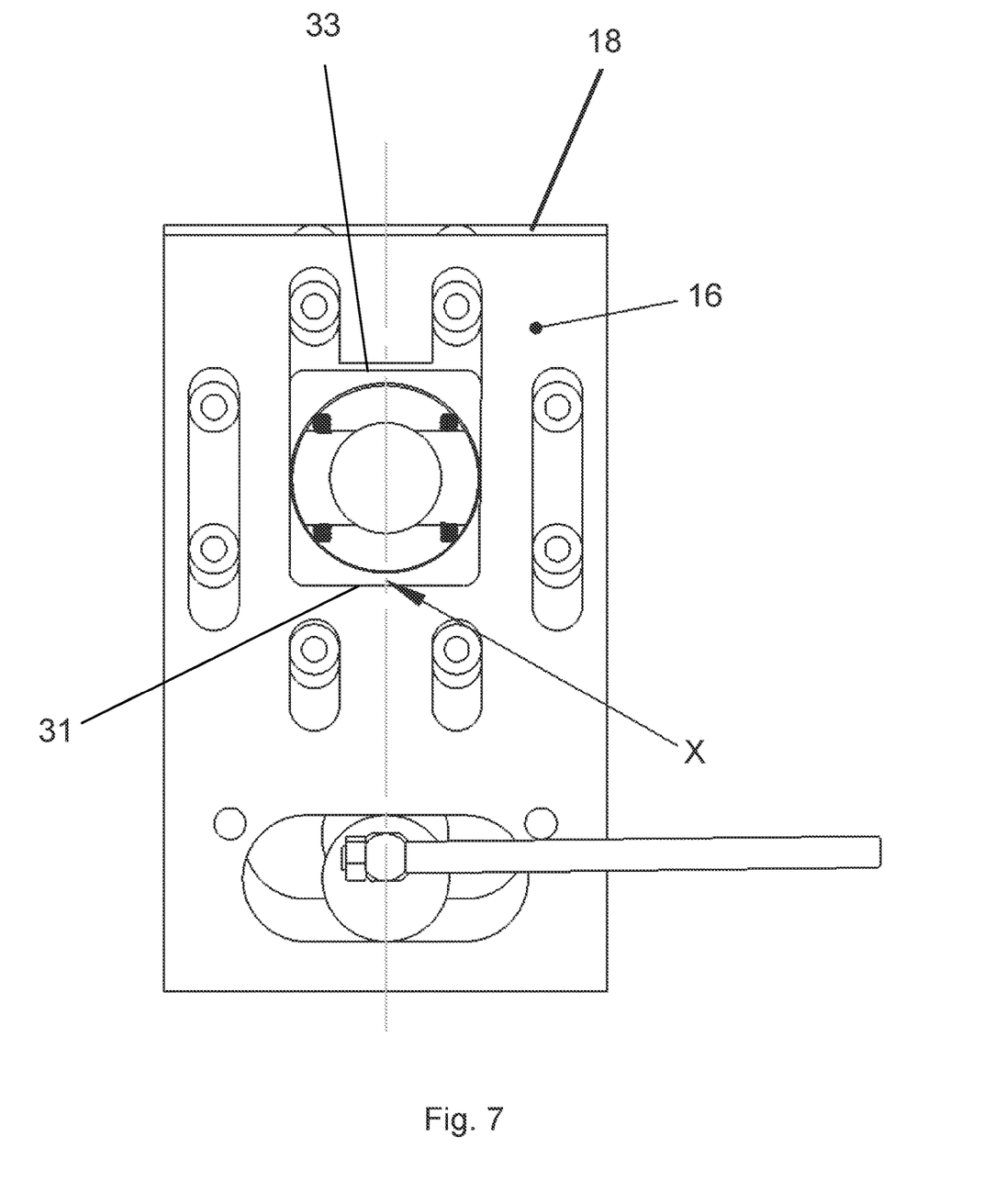
FIG. 7 is similar to FIG. 6 but showing the BMLO in the unlocked position.

Turning to FIG. 7, the BMLO of the present invention is shown in the unlocked position and in this regard it can be seen that engagement wall sections 31 and 33 are no longer engaged with the adjustment screws on the coupler 32.

As can be seem from the above the BMLO of the present invention has the following benefits:

an improved method to lock out a valve for the safety of operating personnel.

two plates that are caused to move via lever (or wrench) operated cams which pinch a flatted portion of a coupler, actuator shaft or valve shaft to prevent rotation.

optional adjustability of the locking position.

cam axis positions are aligned with the axis of the moveable plates so that forces applied to the plates are not able to cause rotation of the cams nor the subsequent unintended disengagement of the BMLO.

a lever to cause rotation of the stem to which the cams are mounted, but which may be removed to allow operation via a common wrench.

an apparatus enabling padlocking of the moveable plates in either the engaged or disengaged positions to prevent unauthorized operation.

has provisions for optional markings to clearly identify the state of the BMLO. An ability exists to 'hide' markings as the moveable plates change positions so that only the appropriate markings are visible in both the engaged and disengaged positions.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus for locking the position of a rotary valve having a valve shaft adapted to have first and second opposed, flatted formations, comprising:
 a first cam follower having first and second spaced apertures, said first aperture being partially defined by a first wall section;
 a second cam follower having third and fourth spaced apertures, said first and second apertures being in at least partial register with said third and fourth apertures, respectively, said third aperture being at least partially defined by a second wall section, said first aperture and said third aperture having portions which are in register to form a passage for said shaft;
 a cam assembly mounted in operative engageability with first and second cam followers, said cam assembly comprising:
  a stem extending through said first and second cam followers;
  first and second cams mounted in axially spaced relationship on said stem, said first cam being drivingly engageable with said first cam follower, said second cam being drivingly engageable with said second cam follower;
 whereby rotation of said stem causes said first and second cams to engage said first and second cam followers, respectively, and said first and second wall sections into operative engagement with said first and second flatted formations, respectively.

2. An apparatus for locking the position of a rotary valve having a valve shaft adapted to have first and second opposed, flatted formations, comprising:
   a plate stack, said plate stack comprising:
      first and second fixed plates having first and second registering openings, respectively;
      a first movable plate having first and second spaced apertures, said first aperture being partially defined by a first wall section;
      a second movable plate having third and fourth spaced apertures, said first and second apertures being in at least partial register with said third and fourth apertures, respectively, said third aperture being at least partially defined by a second wall section, said first aperture and said third aperture having portions which are in register to form a passage for said shaft;
   a cam assembly mounted in said plate stack, said cam assembly comprising:
      a stem extending through said first and second movable plates and said first fixed plate;
      first and second cams mounted in axially spaced relationship on said stem, said first cam being drivingly engageable with said first movable plate, said second cam being drivingly engageable with said second movable plate;
   whereby rotation of said stem causes said first and second cams to engage said first and second movable plates, respectively, and said first and second wall sections into operative engagement with said first and second flatted formations, respectively.

\* \* \* \* \*